(12) United States Patent
Günther

(10) Patent No.: US 6,267,007 B1
(45) Date of Patent: Jul. 31, 2001

(54) LEVEL SENSOR

(75) Inventor: Klaus-Peter Günther, Aarbergen (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/529,508

(22) PCT Filed: Oct. 16, 1998

(86) PCT No.: PCT/EP98/06580

§ 371 Date: May 8, 2000

§ 102(e) Date: May 8, 2000

(87) PCT Pub. No.: WO99/20986

PCT Pub. Date: Apr. 29, 1999

(30) Foreign Application Priority Data

Oct. 20, 1997 (DE) .............................. 197 46 276

(51) Int. Cl.$^7$ .......................... G01F 23/32; G01F 23/30; G01F 23/00
(52) U.S. Cl. ................. 73/317; 73/305; 73/314; 73/290 R; 340/625
(58) Field of Search ............................. 73/317, 318, 313, 73/314, 308, 305, 290 R; 340/625; 361/284; 116/109; 702/55

(56) References Cited

U.S. PATENT DOCUMENTS

| | | | |
|---|---|---|---|
| 1,885,051 | 10/1932 | Smulski | 73/317 |
| 3,925,747 | 12/1975 | Woodward et al. | 338/33 |
| 4,746,776 | * 5/1988 | Komaniak | 200/84 R |
| 5,152,170 | 10/1992 | Liv | 73/317 |
| 5,341,679 | * 8/1994 | Walkowski et al. | 73/317 |
| 5,765,435 | * 6/1998 | Grotschel et al. | 73/313 |

FOREIGN PATENT DOCUMENTS

| | | |
|---|---|---|
| 3320492 | 12/1984 | (DE) . |
| 3735967 | 5/1988 | (DE) . |
| 4438322 | 5/1996 | (DE) . |
| 2656419 | 6/1991 | (FR) . |
| 2661497 | 10/1991 | (FR) . |

* cited by examiner

Primary Examiner—Daniel S. Larkin
Assistant Examiner—Dennis Loo
(74) Attorney, Agent, or Firm—Richard A. Speer; Mayer, Brown & Platt

(57) ABSTRACT

A filling level sensor has a carrier part (1) having a lever wire (3) which is attached to a bracket (2) and is axially guided by a bar-shaped apron (11). The bracket (2) has webs (9, 10) which protrude radially with respect to its pivotable and axially nondisplaceable bearing and over which flange elements (7, 8) of the carrier part (1) engage. As a result, the bracket (2) is at a constant distance from the carrier part (1) and is additionally of particularly simple design.

17 Claims, 2 Drawing Sheets

LEVEL SENSOR

BACKGROUND OF THE INVENTION

The invention relates to a filling level sensor for generating electrical signals as a function of a filling level of a fluid in a container, having a bracket which is mounted on a carrier part in a pivotable and axially nondisplaceable fashion and which activates a regulator as a function of its adjustment angle, having a lever wire attached to the bracket and fitted with a float, and having an axial guide arranged at a distance from the pivot axis of the bracket.

Such filling level sensors are used in current motor vehicles, for example, for determining a filling level of fuel in a fuel container, and are known from practice. Here, the bracket has, as an axial guide, a hook for engaging behind a carrier part collar which is arranged at a distance from the bearing. Forces which are transmitted from the float to the lever wire and thus to the bracket are, as a result, supported in the region of the pivot axis and of the axial guide. The regulator is designed as a potentiometer with a slideway arranged on the carrier part and a sliding contact which is attached to the bracket and is prestressed against the slideway. The axial guidance of the bracket ensures that a constant distance is maintained between the bracket and the carrier part, and thus that there is an envisaged degree of prestress of the sliding contact against the slideway.

A disadvantage with the known filling level sensor is that as a result of the hook for the axial guidance the bracket is designed as a component which is difficult to produce using injection molding technology. Furthermore, in the known filling level sensor, connection points of the lever wire to the bracket are very highly stressed by forces acting on the float. This requires the lever wire to be attached to the bracket in a structurally demanding and cost-intensive way (FR 2,661, 497; FR 2,656,419). The invention is based on the problem of designing a filling level sensor of the type mentioned at the beginning in such a way that it is of the simplest possible design and is as cost-effective as possible to produce.

This problem is achieved according to the invention by virtue of the fact that the guide has an apron which is arranged on the carrier part and engages over the lever wire.

As a result of this design, forces which are transmitted from the float to the lever wire are supported in the region of the lever wire by the apron so that the connection of the lever wire to the bracket is stressed to a particularly low degree. The bracket does not require a hook for the axial guidance and is therefore of particularly simple design. Since all the elements of the axial guide are arranged on the carrier part, the bracket is very simple to produce using injection molding technology. As a result, the filling level sensor according to the invention is particularly cost-effective.

BRIEF SUMMARY OF THE INVENTION

In accordance with one advantageous development of the invention, this apron is of particularly simple design and has very small dimensions if it is of bar-shaped design. As a result, the filling level sensor according to the invention can easily be introduced into the container through an opening which is very small in design. Furthermore, the lever wire is, as a result of this design, guided in a particularly reliable way so that the envisaged prestress of the sliding contact against the slideway is ensured at all times. Thanks to the invention, a magnetically active position sensor can also be used as a regulator, in which sensor a magnet which is arranged on the bracket is guided at a constant distance via a resistance network which is attached to the carrier part.

In accordance with another advantageous development of the invention, the pivoting of the bracket is damped only insignificantly by friction losses or by adhesion of the apron to the lever wire if the regions of the apron and of the carrier part which face the lever wire each have a narrow guideway for guiding the lever wire.

According to another advantageous development of the invention, the lever wire can be introduced particularly easily between the guideways if the guideways are spaced apart in the direction of the lever wire.

According to another advantageous development of the invention, the mounting of the lever wire is simplified further if a guideway of the carrier part is arranged on a web which is inclined in the direction of the pivot axis of the bracket.

The pivoting range of the lever wire can, according to another advantageous development of the invention, be delimited with particularly little constructional outlay if the apron is connected to the carrier part by means of arms and if the arms are designed so as to delimit the pivoting range of the lever wire.

The filling level sensor according to the invention is composed of a particularly small number of components to be mounted if the apron is produced in one piece with the carrier part. As a result, for example, the bracket can firstly be mounted on the carrier part. Then, the lever wire can be pushed through between the two guideways of the carrier part and of the apron.

The mounting of the filling level sensor according to the invention is simplified further if the apron is attached to the carrier part by means of a latching connection.

According to another advantageous development of the invention, the apron can be arranged particularly closely to the end of the bracket if the apron is of bow-shaped design corresponding to the pivoting range of the bracket.

According to another advantageous development of the invention, the bearing of the bracket on the carrier part requires only very small dimensions to absorb high axial forces if the bracket has at least two radially protruding webs, and the carrier part has flange elements which engage over the webs and are spaced apart from one another corresponding to the dimensions of the webs. In order to mount the device, the webs of the bracket are simply inserted between the flange elements and then pivoted in under the flange elements.

According to another advantageous development of the invention, the bearing of the bracket has particularly low friction if the webs have sliding elements which bear on the flange elements and/or the carrier part.

According to another advantageous development of the invention, the bearing of the bracket on the carrier part is of a particularly simple structural design if the bracket has a drilled hole, and the carrier part has a spigget which penetrates the drilled hole.

The lever wire could, as in the case of the known filling level sensor, be attached to the top of the bracket. However, as a result of this, the filling level sensor has very large dimensions. The dimensions of the filling level sensor according to the invention are reduced if a latching element of the bracket for holding the lever wire is arranged in a lateral region. As a result, the lever wire is located in a space saving fashion in the same plane as the bracket.

The lever wire could, for example, be attached exclusively to the bracket. In order to absorb tensile or compressive forces acting on the lever wire, the attachment of the lever wire to the bracket must, however, be of particularly stable design. According to another advantageous development of the invention, the tensile and compressive forces of the lever wire are not transmitted to the bracket if the spigget of the carrier part has a drilled hole for receiving an angled portion of the lever wire. As a result, the bracket can be of particularly light and compact design.

According to another advantageous development of the invention, when the lever wire is inserted into the drilled hole of the spigget the bracket can be mounted and dismounted if the bracket has a recess which extends from the angled portion of the lever wire to above one of the webs.

Forces acting on the lever wire could cause the bracket to tip between the bearing and the apron. However, according to another advantageous development of the invention, the tipping does not bring about incorrect signals of the regulator if the regulator is arranged in the center between the apron and the pivot axis of the bracket.

The filling level sensor according to the invention can easily be prevented from producing noise if the bracket or the carrier part is produced from the plastic PK and the respective other component is produced from POM. The plastic PK is known under the trade name Carilon and does not cause undesired noise when the component slides over the carrier part produced from POM. Noise is not produced when the lever wire produced from metal slides on the plastic of the carrier part either.

DESCRIPTION OF THE DRAWINGS

The invention permits numerous embodiments. In order to clarify its basic principle further, three of these embodiments are illustrated in the drawing and described below. In said drawing

DETAILED DESCRIPTION OF THE INVENTION

Figure 1:
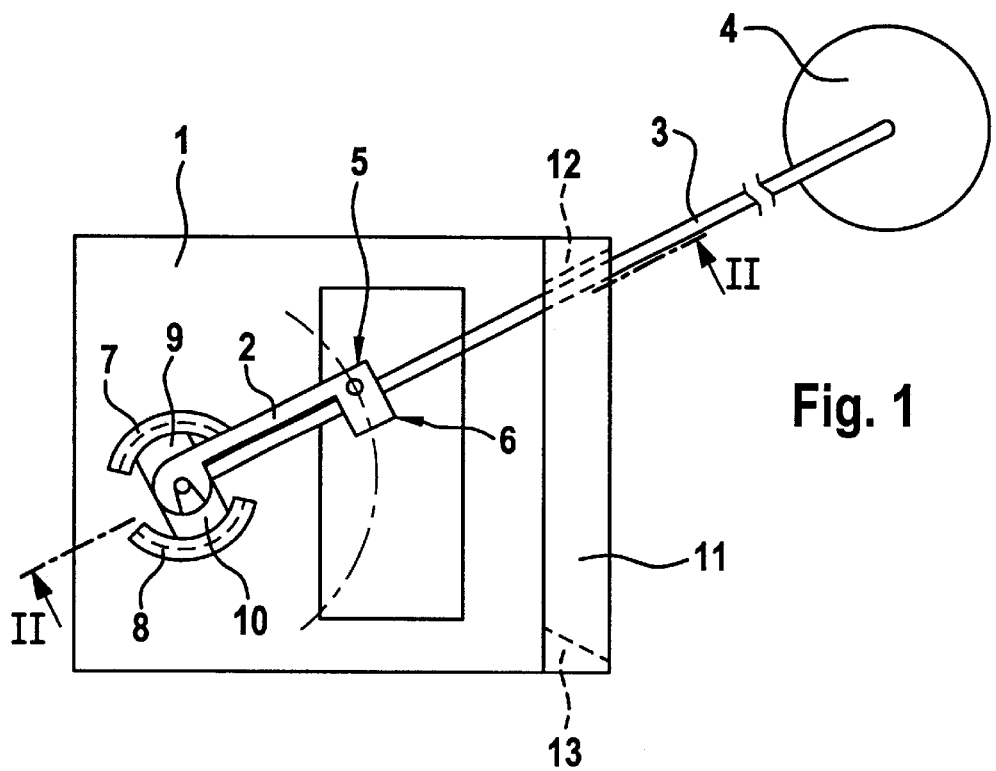
FIG. 1 shows a schematic representation of a filling level sensor according to the invention.

FIG. 1 shows a filling level sensor according to the invention in a schematic view. The filling level sensor has a carrier part 1 on which a bracket 2 is pivotably and axially nondisplaceably mounted. A lever wire 3 with a float 4 is attached to the bracket 2. The filling level sensor can be mounted, for example, on a vertical wall (not illustrated) of a fuel container of a motor vehicle. The position of the float 4 which follows the level of the fuel is sensed by a regulator 5 which generates electrical signals as a function of the adjustment angle of the bracket 2. The bracket 2 has in a lateral region a latching element 6 for holding the lever wire 3.

The carrier part 1 has two flange elements 7, 8 which engage over two radially protruding webs 9, 10 of the bracket 2. The flange elements 7, 8 are at a distance from one another corresponding to the width of the webs 9, 10 so that the webs 9, 10 can, for the purpose of mounting, be inserted between the flange elements 7, 8 and then pivoted in under the flange elements 7, 8. The webs 9, 10 and the flange elements 7, 8 thus form an axial bearing of the bracket 2. The carrier part 1 has an apron 11 which engages over the lever wire 3 and which prevents the lever wire 3 pivoting perpendicularly with respect to the plane of the drawing. The apron 11 is held laterally by one arm 12, 13 in each case. The arms 12, 13 form stops for delimiting the pivoting range of the lever wire 3.

Figure 2:
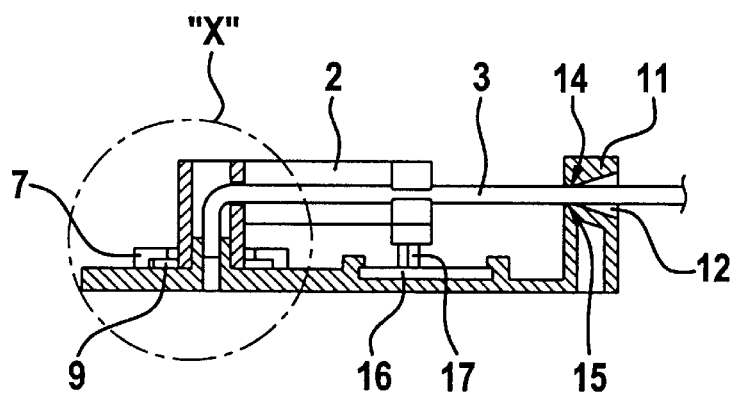
FIG. 2 shows a longitudinal section through the filling level sensor from FIG. 1 along the line II—II.

FIG. 2 shows the filling level sensor from FIG. 1 in a sectional view along the line II—II. Here it is apparent that the apron 11 and the carrier part 1 each have a narrow guideway 14, 15 for the lever wire 3. As a result, the lever wire 3 is guided with particularly low friction. The regulator 5 is designed as a magnetically active position sensor and has a resistance network 16 which is clipped onto the carrier part 1, and a magnet 17 which is attached to the bracket 2.

Figure 3:
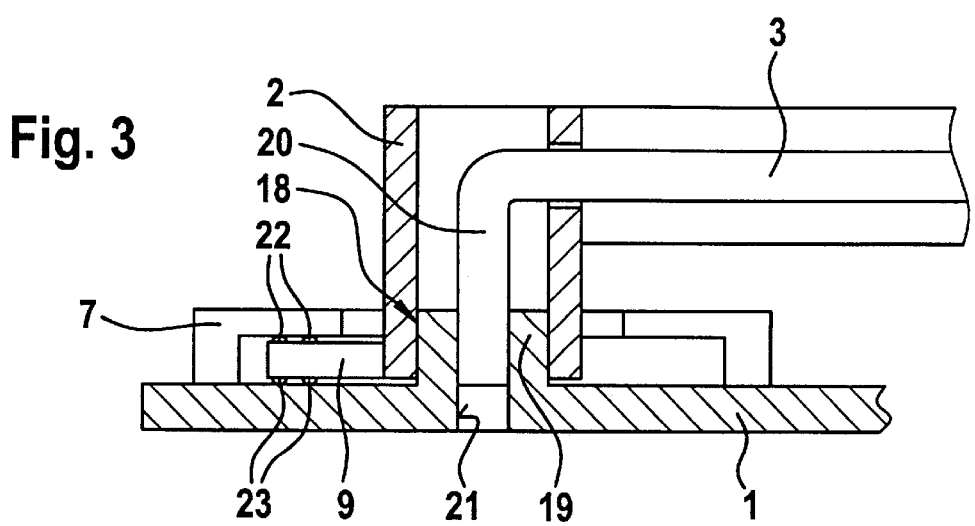
FIG. 3 shows a highly enlarged detail "X" from FIG. 2.

FIG. 3 illustrates the bearing of the bracket 2 on the carrier part 1 in a highly enlarged view. The carrier part 1 has a spigget 19, penetrating a drilled hole 18 of the bracket 2, as a radial bearing. The lever wire 3 has an angled portion 20 which penetrates a central drilled hole 21 of the spigget 19. As the magnet 17 of the regulator 5 is attached to the bracket 2, the angled portion 20 of the lever wire 3 can have a large degree of play in the drilled hole 21 without the risk of incorrect measurement of the filling level sensor. The webs 9, 10 of the bracket 2 have knob-like sliding elements 22, 23 which bear on the carrier part 1 and the flange elements 7, 8.

In order to mount the filling level sensor, the bracket 2 is firstly plugged onto the spigget 19 of the carrier part 1. The webs 9, 10 move in this process into a position between the flange elements 7, 8. Then, the lever wire 3 is pushed through between the guideways 14, 15 of the apron 11 and of the carrier part 1 and its angled portion 20 is inserted into the drilled hole 21 of the spigget 19. The bracket 2 can then be pivoted until the webs 9, 10 move under the flange elements 7, 8. After the lever wire 3 has been clipped into the latching element 6 of the bracket 2, the filling level sensor is mounted.

Figure 4:
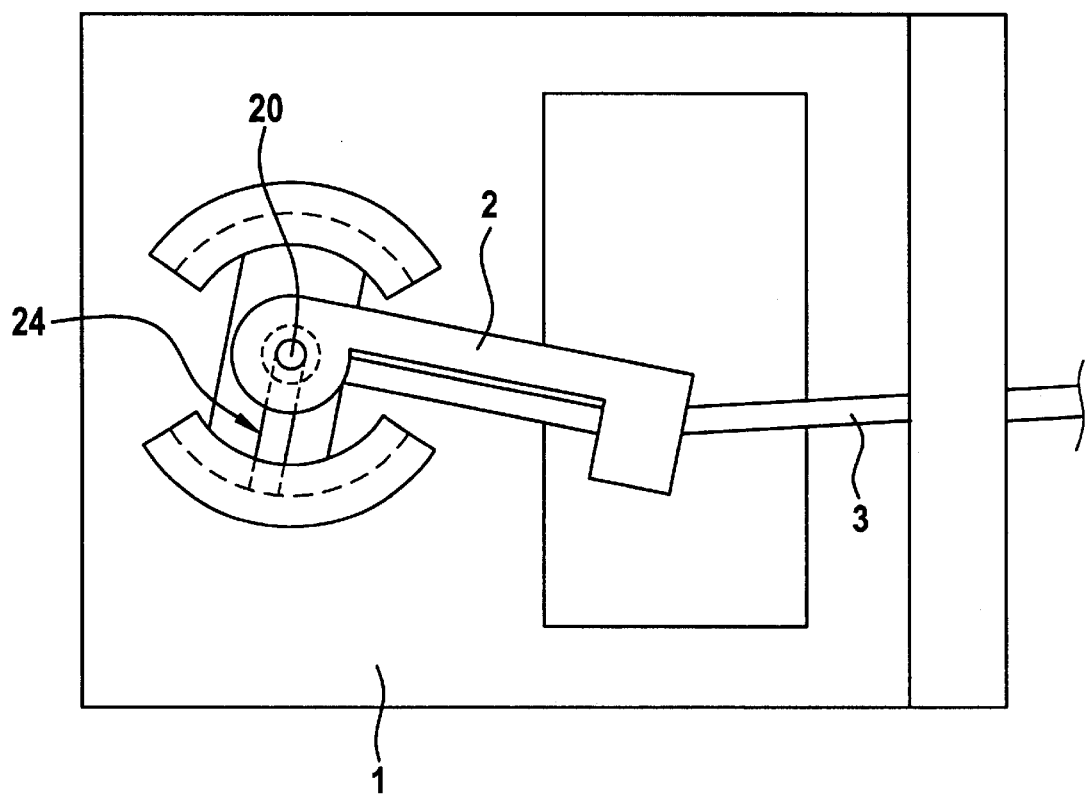
FIG. 4 shows a further embodiment of the filling level sensor according to the invention.

FIG. 4 shows a further embodiment of the filling level sensor according to the invention. The bracket 2 has, in the region of its axis of rotation, a recess 24 which extends radially outwards above one of the webs 9. The recess 24 has a width corresponding to the lever wire 3. As a result, when the lever wire 3 is inserted, the bracket 2 can be mounted and dismounted. The lever wire 3 is slightly bowed in the region of the latching element 6 of the bracket 2. At this point, the regulator 5 can be adjusted to the position of the float 4 (illustrated in FIG. 1) by bending the lever wire 3.

Figure 5:
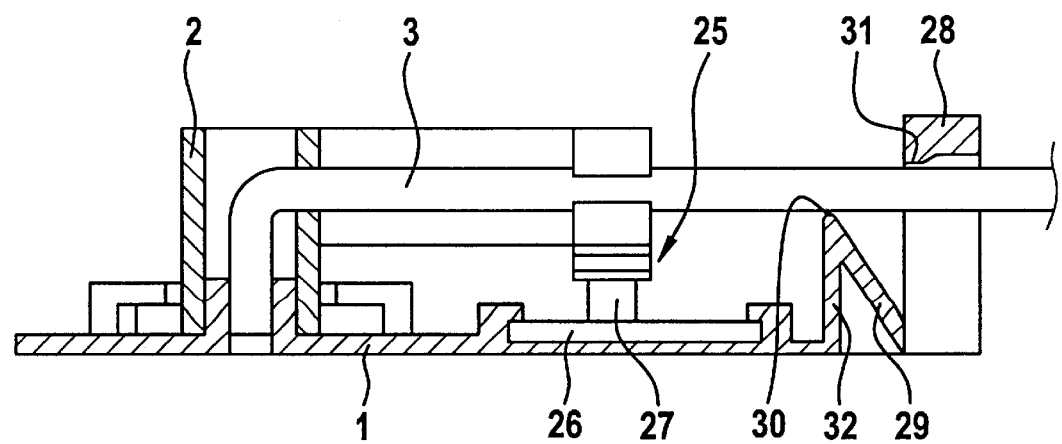
FIG. 5 shows a further embodiment of the filling level sensor according to the invention in a longitudinal section.

FIG. 5 shows a further embodiment of the filling level sensor according to the invention in a longitudinal section. The filling level sensor has a regulator 25 which is designed as a potentiometer and has a thick-film slideway 26 which is attached to the carrier part 1 and against which a sliding contact 27, attached to the bracket 2, is prestressed. Of course, the regulator 25 may also be designed as a magnetically active position sensor, as in the embodiment according to FIG. 1. The lever wire 3 is axially guided by guideways 30, 31 which are arranged on a bar-shaped apron 28 and an oblique web 29. The web 29 is spaced apart from the apron 28 in the direction of the lever wire 3. This design permits the lever wire 3 to be inserted under the apron 28 in a particularly simple way. The web 29 is supported on the carrier part 1 via a vertical wall 32.

What is claimed is:

1. A filling level sensor for generating electrical signals as a function of a filling level of a fluid in a container, having a bracket which is mounted on a carrier part in a pivotable and axially nondisplaceable fashion and which activates a regulator as a function of its adjustment angle, the bracket having at least two radially protuding webs and the carrier part having flange elements which engage over the webs and are spaced apart from one another in accordance with the dimensions of the webs, the sensor having a lever wire attached to the bracket and fitted with a float, and having an axial guide arranged at a distance from the pivot axis of the bracket, characterized in that the guide has an apron (11, 28) which is arranged on the carrier part (1) and engages over the lever wire (3).

2. The filling level sensor as claimed in claim 1, wherein the apron (11, 28) is of bar-shaped design.

3. The filling level sensor as claimed in claim 1 or 2, wherein the regions of the apron (11, 28) and of the carrier part (1) which are facing the lever wire (3) each have a narrow guideway (14, 15, 30, 31) for guiding the lever wire (3).

4. The filling level sensor as defined in claim 3, wherein the guideways (30, 31) are spaced apart in the direction of the lever wire (3).

5. The filling level sensor as defined in claim 3, wherein a guideway (30) of the carrier part (1) is arranged on a web (29) which is inclined in the direction of the pivot axis of the bracket.

6. The filling level sensor as defined in at claim 1, wherein the apron (11) is connected to the carrier part (1) by means of arms (12, 13), and wherein the arms (12, 13) are designed so as to delimit the pivoting range of the lever wire (3).

7. The filling level sensor as defined in claim 1, wherein the apron (11, 28) is produced in one piece with the carrier part (1).

8. The filling level sensor as defined in claim 1, wherein the apron (11, 28) is attached to the carrier part (1) by means of a latching connection.

9. The filling level sensor as defined in claim 1, wherein the apron (28) is of bow-shaped design corresponding to the pivoting range of the bracket (2).

10. The filling level sensor as defined in claim 1, wherein the bracket (2) has at least two radially protruding webs (9, 10), and the carrier part (1) has flange elements (7, 8) which engage over the webs (9, 10) and are spaced apart from one another corresponding to the dimensions of the webs (9, 10).

11. The filling level sensor as defined in claim 1, wherein the webs (9, 10) have sliding elements (22, 23) which bear on the flange elements (7, 8) and/or the carrier part (1).

12. The filling level sensor as defined in claim 1, wherein the bracket (2) has a drilled hole (18) and the carrier part (1) has a spigget (19) which penetrates the drilled hole (18).

13. The filling level sensor as defined in claim 1, wherein a latching element (6) of the bracket (2) for holding the lever wire (3) is arranged in a lateral region.

14. The filling level sensor as defined in claim 12, wherein the spigget (19) of the carrier part (1) has a drilled hole (21) for receiving an angled portion (20) of the lever wire (3).

15. The filling level sensor as defined in claim 1, wherein the bracket (2) has a recess (24) which extends from the angled portion (20) of the lever wire (3) to above one of the webs (9, 10).

16. The filling level sensor as defined in claim 1, wherein a sliding contact (27) or a magnet (17) of the regulator (5, 25) is arranged in the center between the apron (11, 28) and the pivot axis of the bracket (2).

17. The filling level sensor as defined in claim 1, wherein the bracket (2) or the carrier part (1) is produced from the plastic PK, and the respective other component is produced from POM.

\* \* \* \* \*